United States Patent [19]

Fukase et al.

[11] 4,011,493
[45] Mar. 8, 1977

[54] SERVO-CONTROLLER

[75] Inventors: Hisahiko Fukase; Minoru Yoneda, both of Yokohama, Japan

[73] Assignees: Ishikawajima-Harima Jukogyo Kabushiki-Kaisha; Kayabakogyo Kabushiki-Kaisha, both of Tokyo, Japan

[22] Filed: Dec. 2, 1974

[21] Appl. No.: 528,950

[30] Foreign Application Priority Data

Dec. 3, 1973  Japan ............................ 48-135858

[52] U.S. Cl. .............................. 318/568; 318/573; 425/381; 235/150.53
[51] Int. Cl.² ......................................... B29D 23/04
[58] Field of Search .......... 318/567, 568, 569, 573, 318/625; 425/141, 381, DIG. 206; 235/150.53, 197

[56] References Cited

UNITED STATES PATENTS

| 3,600,747 | 8/1971 | McCarty | 425/141 |
|---|---|---|---|
| 3,649,825 | 3/1972 | Burrage | 235/197 |
| 3,712,772 | 1/1973 | Hunkar | 425/141 |
| 3,753,636 | 8/1973 | Waterloo | 425/381 |
| 3,865,528 | 2/1975 | Roess | 425/381 |

*Primary Examiner*—Robert K. Schaefer
*Assistant Examiner*—John J. Feldhaus
*Attorney, Agent, or Firm*—Saul Jecies

[57] ABSTRACT

A servo-controller, where, in order to enable a second mobile member to carry out a certain programmed sequence of operations corresponding to the moving position, speed, pressure, force or torque of a first mobile member, the said moving position speed, pressure, force or torque of the first mobile member is detected as an analog signal, which is compared with each of various level signals sorted stepwise and identified so as to operate the corresponding relays in succession; where the successive actions of these relays is such that control is effected by a first switch group (on a pin board connection panel), a second switch group (for carrying out switching operations for the step subsequent to each member of the first group) and a third switch group for selecting the said level signal; a remainder derived from the difference signal between set signals passed through these first and second switch groups, respectively, is multiplied by another remainder derived from the difference signal between the said analog signal and a level signal passed through the third switch group and the resultant product is combined additively with the set signal passed through the first switch group, so that the resultant sum is applied as an input signal to a servo-amplifier so as to control the motion of the said second mobile member.

5 Claims, 8 Drawing Figures

SERVO-CONTROLLER

BACKGROUND OF THE INVENTION:

The present invention concerns electronic control equipment for prior programing of load control conditions by means of an arrangement by which pins are inserted at will into a pin board connection panel and effecting actual control of the loads by means of a servo-amplifier output which depends upon the programmed load control conditions.

Equipment of this kind, known as servo-controllers, is used commonly as electronic control equipment for industrial machinery such as plastic molding machines, industrial robots, machine tools, etc. In order to facilitate understanding of the present invention, it will be explained referring to an example of its application to a plastic molding machine.

Among servo-controllers for plastic molding machines, such an example as that presented in the specification of the U.S. Pat. No. 3,712,772 of Jan. 23, 1973, entitled "Control System for Parison Extruders" and granted to Denes B. Hunkar, is well known. This system has proved quite useful to date. Namely, in this system a parison is extruded by means of an injection cylinder, while an electronic timer is set at a certain time according to the extrusion cycle. In practice, the extrusion cycle is divided automatically into equal sections, so that a pulse may be derived from each of these sections. This pulse, as it is produced, works successively an electronic switch unit consisting of a shift resistor and an electronic switch. This switch unit selects output terminals on a pin board where the wall thickness of the parison is programmed. Therefore, a parison wall thickness signal is extracted successively and is applied to the input of a servo-amplifier. The output from the servo-amplifier is transmitted to a servo-valve, which operates to move a mandrel cylinder. In this case, the motion of the mandrel cylinder is sensed constantly by a differential transformer and the signal is fed back to the input side of the said servo-amplifier. Thus, the mandrel cylinder moves up and down according to the parison wall thickness signal voltage programmed beforehand by means of the pin board and determines the relative motion between an annular die of tubular type and the mandrel.

As stated above, it may be granted that the said control system has yielded an excellent technique as a modern servo-controller. Still, as electronic control equipment for plastic molding machines, a few problems remain to be resolved. The first is that it is difficult to set the parison wall thickness exactly. This is ascribed to the fact that the control is achieved by converting the extrusive motion of injection cylinders into corresponding time units. Namely, as the electronic switch unit carries out a sequence of work successively in response to each of the pulses produced by the electronic timer, the mandrel motion fluctuates accordingly. In this case, however, the extrusive motion of injection cylinders cannot always be kept at a constant speed as it depends both upon the relative position of the mandrel and the die as well as on the type and viscosity of the plastic materials. The injection pressure, therefore, fails to follow the said work sequence precisely and this gives variations in the quantity of the plastic shot, thus making it difficult to set the wall thickness of parisons exactly. The second problem is that, since the extrusive motion of injection cylinders is converted to a time-dependent basis by means of an electronic timer, the time setting of the electronic timer must be adjusted whenever the injection cylinder undergoes a change in extrusion speed or whenever the said control system is applied to a different plastic molding machine. This adjusting operation can be rather troublesome. The third is that, since the programmed instruction signal voltage changes stepwise, it is impossible to set a large change for the parison wall thickness. Of course, this defect may be avoided to some extent by using the CR interpolation system, but practically no effect is to be expected if the cycle of motion is speeded up. The fourth problem is that, since the shift resistor (a ring counter system) incorporated in the electronic switch unit is liable to operating errors due to electromagnetic noise generated in the peripheral equipment, there is a danger of advancing the work sequence unexpectedly.

SUMMARY OF THE INVENTION:

The purpose of the present invention, therefore, is to present an improved servo-controller of this kind such that it may resolve the abovementioned defects.

Although, as stated above, the present invention has various features which may be of general applicability in electronic control equipment for various industrial machines such as plastic molding machines, industrial robots, machine tools, etc., it is particularily viable in the application to parison extrusion equipment.

According to a preferred embodiment of the invention, the extrusive motion of injection cylinders is converted to an analog signal voltage (or current) through a position detector, so that the wall thickness of parisons may be controlled by progressing the work sequence with an analog signal always corresponding to the actual position of the injection cylinder. In this way the first and second problems are resolved. At the same time a linear interpolation is obtained between the program set points on the pin board connection panel so as to effect a smooth parison wall thickness change, by means of which the said third defect is overcome. Furthermore, the extrusive motion of injection cylinders is detected as an analog signal voltage (or current) so that a sequential feedback loop may be formed by the said signal voltage, thus overcoming the fourth defect.

Accordingly, in the present invention, the servo-controller is composed of a freely selected discontinuity function-generating circuit whose input consists of an analog signal voltage (or current), and a servo-amplifier whose input consists of an output signal voltage (or current) from the said circuit.

The freely selected discontinuity function generating circuit consists essentially of a feedback sequence circuit, a pin board connection panel having output terminals for two systems comprising the first and the second switch groups and their respective logic circuits for addition, subtraction and multiplication.

The sequence circuit compares the input analog signal with each level signal sorted stepwise to produce one or more comparison signals according to the state of the said analog signal and comprises a few relay circuits arranged corresponding to each level signal so as to respond to these comparison signals.

Although a conventional unit may be used as the pin board connection panel, the first and the second switch groups corresponding to the said relay circuits should be arranged so as to form two systems of output terminals, while the first and the second switch groups are maintained in a relationship such that each member of the second switch group consists of switch functions occupying the next successive step to each member of the first switch group.

The logic circuits consist of a subtraction circuit for the difference between the analog and the level signals in the said sequence circuit, another subtraction circuit for the difference between the two output signals obtained through the first and the second switch groups in the said pin board connection panel, a multiplication circuit for these addition and subtraction results and an addition circuit for the sum of this multiplicand and the output signal obtained through the first switch group.

In addition, the servo-amplifier for receiving the output of the freely selected discontinuity function generating circuit may be of conventional circuit configuration. The relay mechanism adopted in the relay circuits constituting the said sequence circuit may be either electronic or electromagnetic.

Thus, due to the adoption of the freely selected discontinuity function generating circuit, the servo-controller of the present invention may obtain a discontinuity function signal with a linear correspondence for instruction signals corresponding to two program set points on the pin board connection panel. The greatest advantage of this effect is that the load may be controlled smoothly and over a wide range.

The above mentioned purpose and other purposes, features and performances of the present invention will be realized by the following explanation of an embodiment example referring to the attached figures. The following explanation deals with a case where the servo-controller according to the present invention is applied to parison extrusion equipment.

Figure 1:
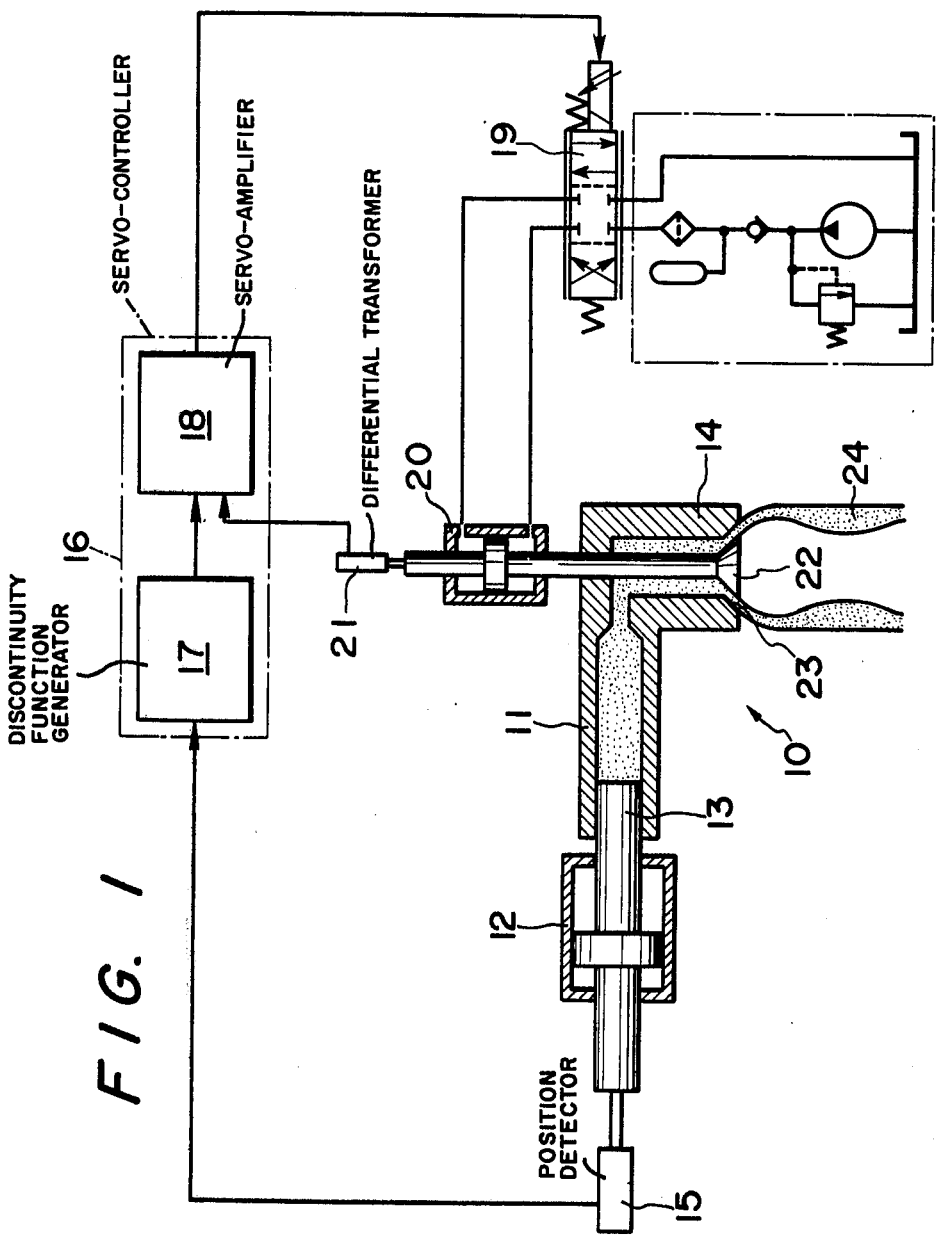
FIG. 1 represents a diagram of parison extrusion equipment incorporating a servo-controller according to the present invention.

DESCRIPTION OF A PREFERRED EMBODIMENT:

FIG. 1 shows an example where a servo-controller according to the present invention is applied to parison extrusion equipment.

An extruder 10 receives into its cylinder 11 a certain amount of plastic, which is heated there and pressed to the die 14 side by a piston 13 movable reciprocally in the said cylinder 11 with an injection cylinder 12. The position of the injection cylinder 12 during extrusion is constantly detected by a position detector 15 interlocked to the base of the piston 13. Since the position detector 15 follows the changing position of the piston 13 in the injection cylinder 12 to produce an analog position signal voltage corresponding to the said changing position, a potentiometer, for instance, of direct-acting type may be used.

The signal voltage for the position of the injection cylinder 12 produced by the said position detector 15 is fed as input to a discontinuity function generator 17 in the servo-controller 16 and the discontinuity function generator 17 takes it as an input signal to produce a parison wall thickness signal pre-programed by a pin board. This parison wall thickness signal is transmitted to a servo-valve 19 through a servo-amplifier 18 in the servo-controller 16 and the servo-valve 19 works in direct or inverse proportion to the parison wall thickness signal to drive the mandrel cylinder 20. In this embodiment, too, as is well known, the motion of the mandrel cylinder 20 is detected constantly by a differential transformer 21 and the signal for its change in position is fed back to the input side of the servo-amplifier 18 in the said servo-controller 16.

At the same time, the said mandrel cylinder 20 determines the position of a mandrel 22 against the die 14 of the extruder 10 by its up and down movement. Thus, the relative position of the die 14 and the mandrel 22 controls the size of the die orifice 23 and eventually the wall thickness of a parison 24 which is extruded from the die orifice 23. Therefore, the parison 24 will be changed in wall thickness according to a parison wall thickness signal which is programmed beforehand in the discontinuity function generator 17 corresponding to the movement of the injection cylinder 12. In this connection, the combination of a position detector 15 for the injection cylinder 12 and a discontinuity function generator 17 constitute an important feature of the present invention.

Figure 2:
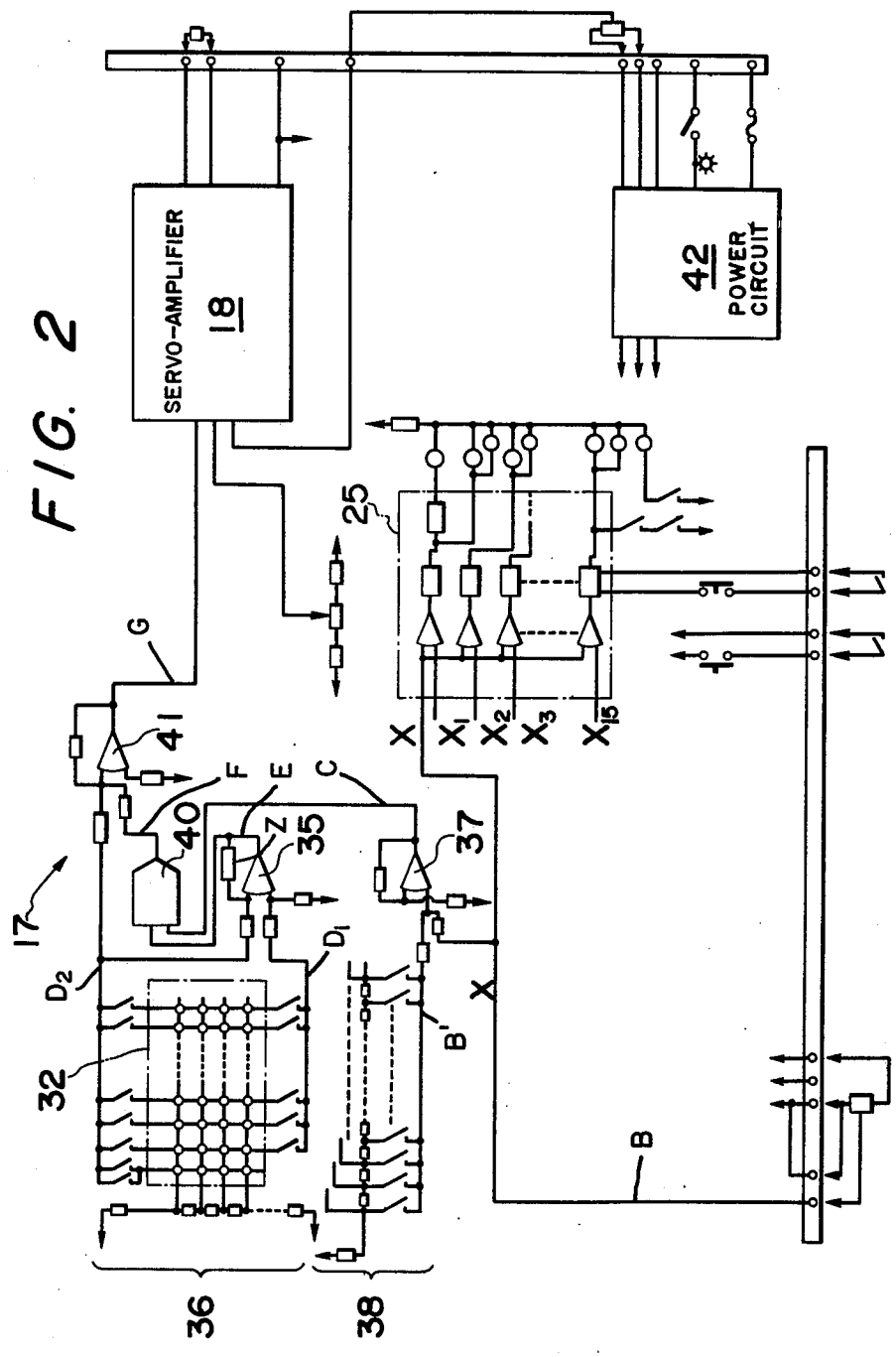
FIG. 2 represents a circuit diagram showing a practical example of the discontinuity function generating circuit in the said servo-controller.

A typical formation of discontinuity function generators 17 will be explained in further detail in the following. The discontinuity function generator 17 comprises electric circuits as shown in FIG. 2 including a sequence circuit 25.

Figure 3:
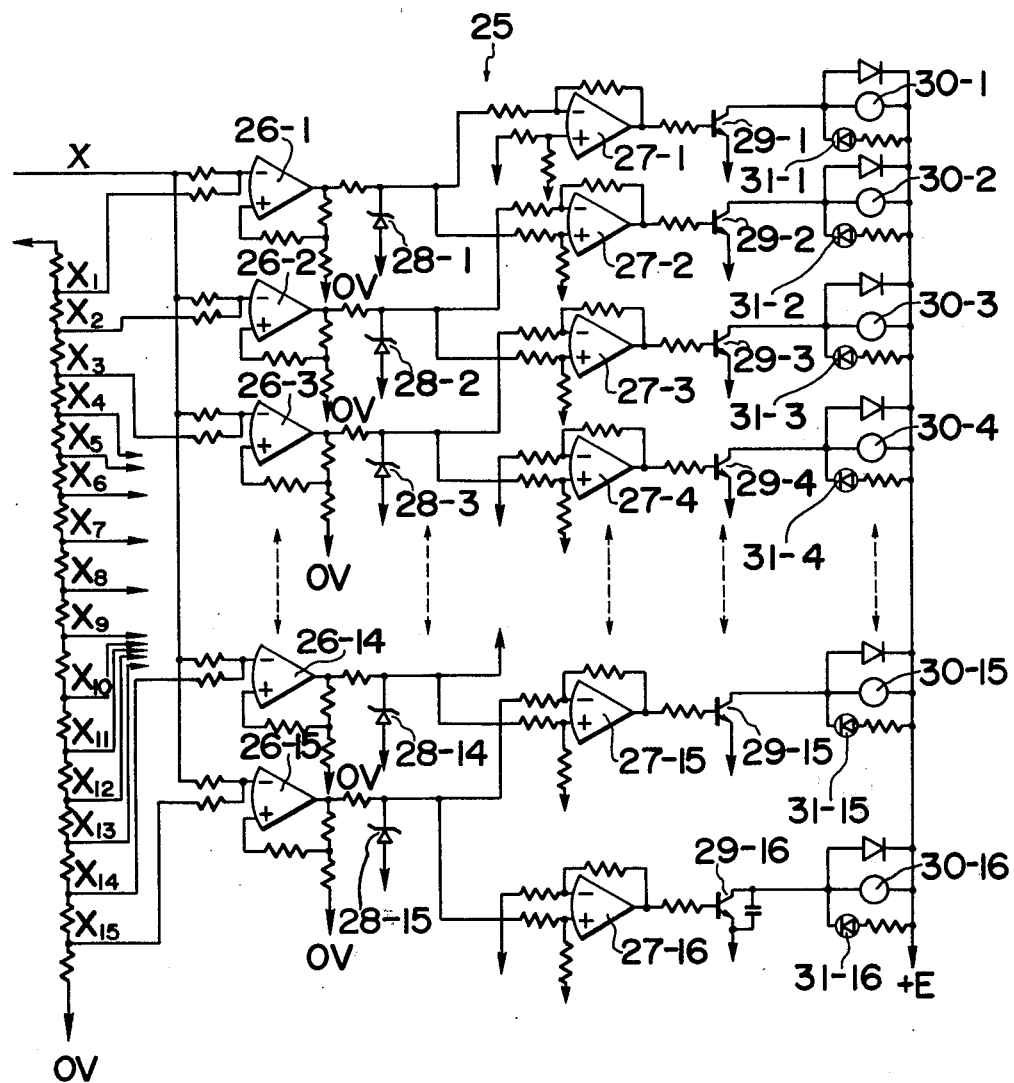
FIG. 3 represents a detailed diagram showing a sequence circuit in the said discontinuity function generating circuit.

The said sequence circuit 25 is shown in detail in FIG. 3. Namely, a positional signal voltage X produced from the position detector 15 for the injection cylinder 12, the first mobile member, is connected so as to form an input voltage of the said sequence circuit 25. In this case, the positional signal voltage X is commonly applied to each input terminal of the negative side of comparators 25-1 - 26-15. While, a level signal voltage (level signal) sorted stepwise into sections $X_1$, $X_2$ . . . . $X_{15}$ is given to each input terminal of the negative side of the comparators 26-1 - 26-15 as shown in the figure so that the said positional signal voltage X may be compared with each of these level signal voltages $X_1$ - $X_{15}$. In this application example, however, since the position signal voltage X is taken as positive, the said level signal voltages $X_1$ - $X_{15}$ are stipulated as negative. Each input terminal of the positive side of the comparators 26-1 - 26-15 is grounded (0 level voltage) through a certain resistance, so that a hysteresis characteristic may be given to the output of these comparators 26-1 - 26-15. This hysteresis characteristic plays a role in preventing the chattering of electromagnetic relays when they are employed in the relay control circuits mentioned below. Circuits 28-1 - 28-15 connected to the output sides of the each of the comparators 26-1 - 26-15 represent limiter circuits for unifying the output voltages. Each output of the comparators 26-1 - 26-15 is transmitted to other comparators 27-1 - 27-16 arranged respectively for identifying the comparison signal. To the output sides of these comparators 27-1 – 27-16 are connected the bases of transistors 29-1 – 29-16 for the operating switches, so that transistors 29-1 – 29-16 may be turned "ON" by the output of these comparators 27-1 – 27-16 to activate electromagnetic relays 30-1 – 30-16.

In this sequence circuit 25, any of the comparators 26-1 – 26-15 works in response to the position signal voltage X. For instance, if we assume that the comparator 26-1 reaches its working range and another comparator 26-2 follows suit, then the outputs of these comparators 26-1, 26-2 will both provide a high level voltage. Thus, among the successive stages of comparators, comparators 27-1 and 27-2 will have a high level voltage across their positive and negative input terminals, while at the same time, except for comparator 27-3, all other comparators of the later steps, 27-4 – 27-16 will have low level voltages across their positive and negative input terminals. Therefore, no output will appear on the identification comparators 27-1, 27-2, 27-4 – 27-16, but only on the comparator 27-3. Thus, only the comparator 27-3 reaches the stipulated output voltage and transistor 29-3 is brought "ON" to excite the electromagnetic relay 30-3. Such a reaction will take place also whenever any of the comparators 26-1 – 26-15 operates and immediately only one of the electromagnetic relays 30-1 – 30-16 will be activated. In view of the above, it will be readily understood that electromagnetic relays 30-1 – 30-16 work successively responding to a continuous change of the positional signal voltage X. In particular, the operation of the electromagnetic relays 30-1 – 30-16 is carried out in such a way that it advances progressively with increasing positional signal voltage X and recedes progressively with decreasing positional signal voltage X. In this sense, it is completely reversible. In addition, with the shifting operation of the electromagnetic relays 30-1 – 30-16, light emitting diodes 31-1 – 31-16 connected in parallel to the electromagnetic relays 30-1 – 30-16 give a visible indication of the operation.

Figure 4:
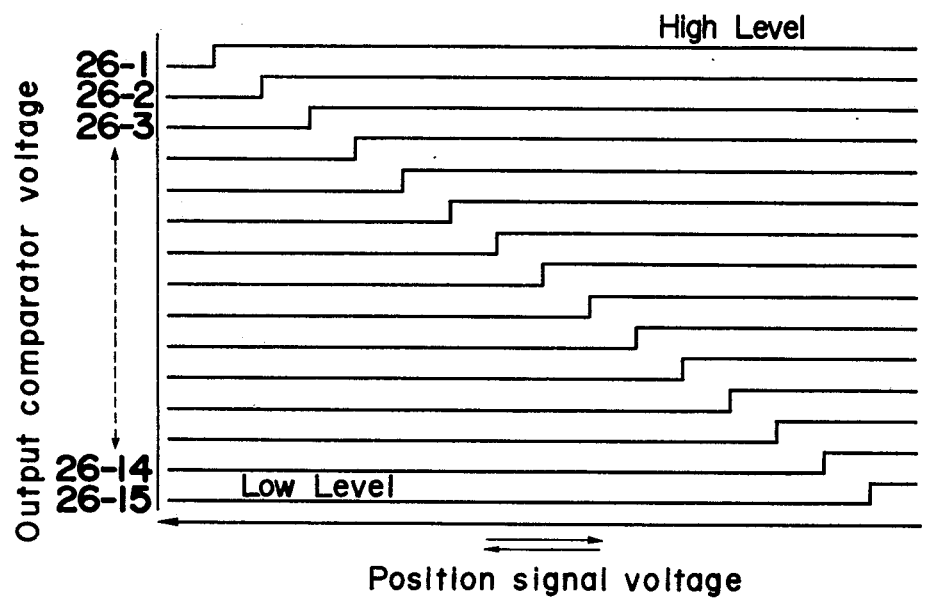
FIGS. 4 and 5 represent output voltage characteristic curves in the circuits of the sequence circuit unit.
Figure 5:
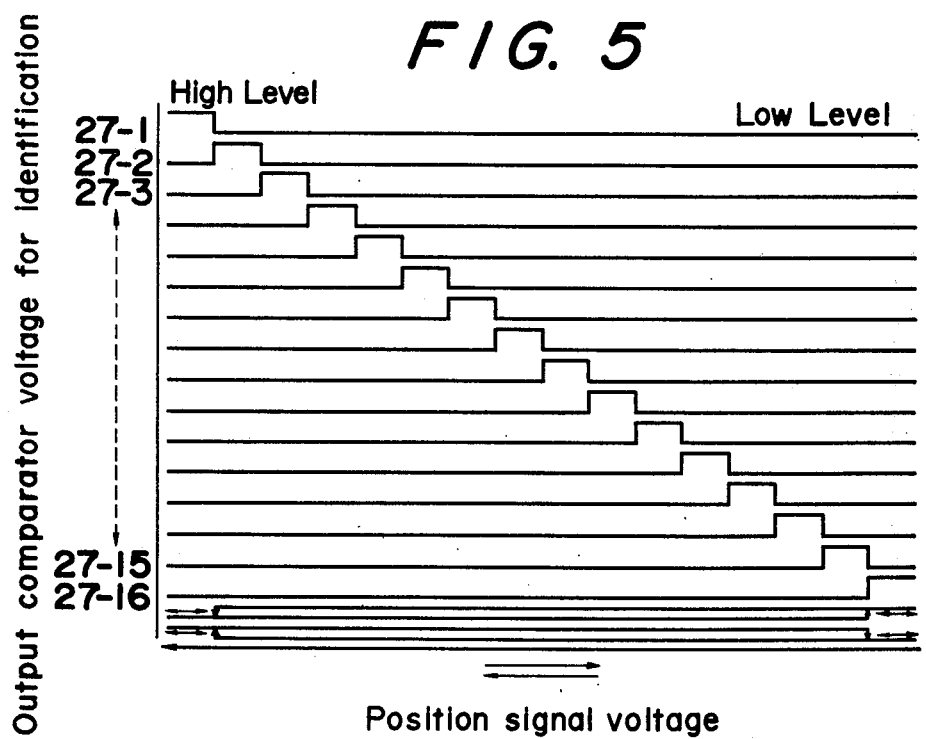

FIG. 4 represents a characteristic diagram showing the relationship between the output voltage of the said comparators 26-1 – 26-15 and the positional signal voltage X. It can be seen that comparators 26-1 – 26-15 will progressively reach their working ranges as the said positional signal voltage X increases. FIG. 5 represents a characteristic diagram showing the relationship between the output voltage of comparators for identification 27-1 – 27-16 and the positional signal voltage X. It is evident that the output voltage of these comparators 27-1 – 27-16 shifts with the changing positional signal voltage X.

Figure 6:
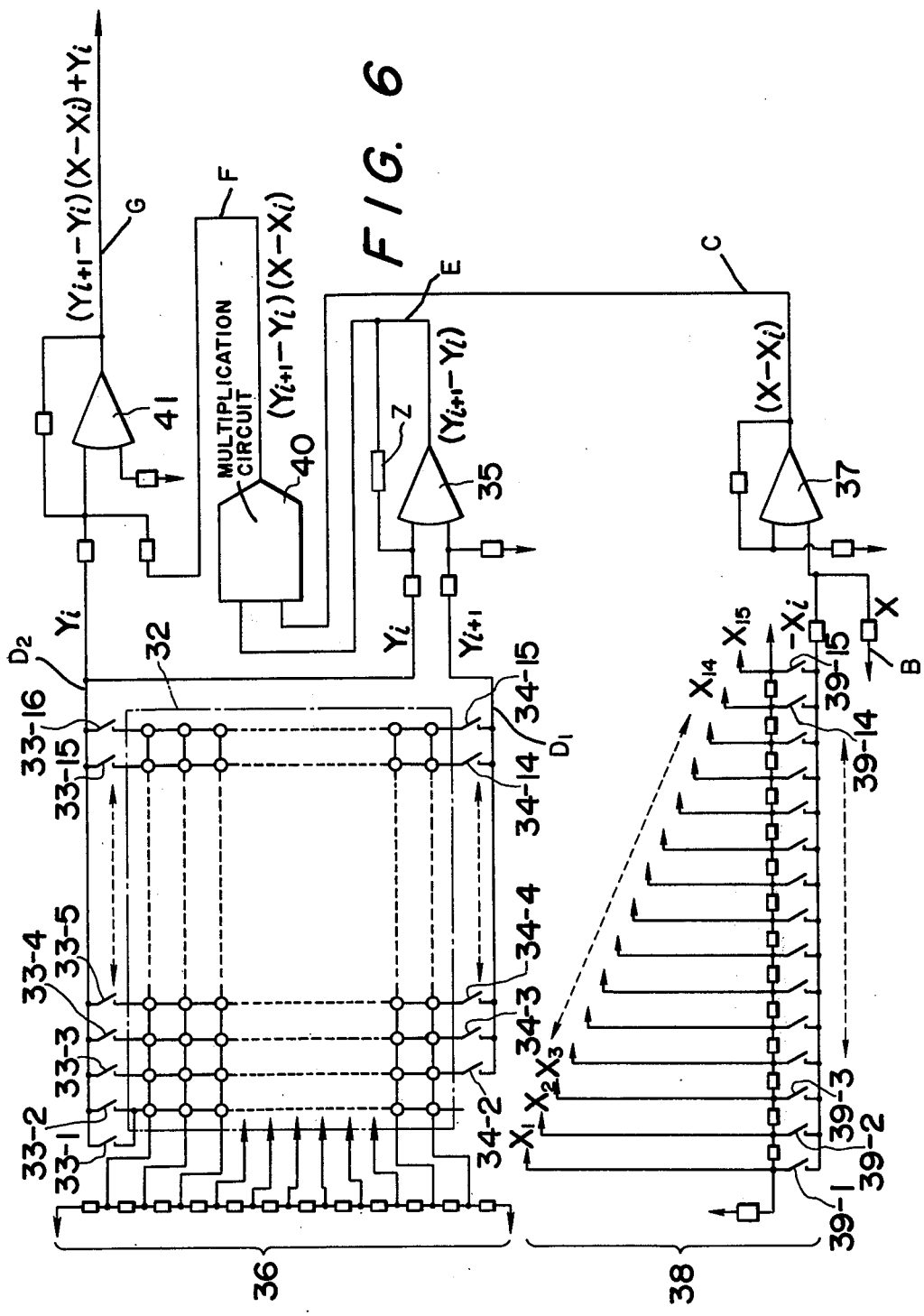
FIG. 6 represents a circuit diagram of the pin board connection panel part.

Referring to FIG. 2 again, the pin board connection panel 32 in the discontinuity function generator 17 is of conventional type as shown in FIG. 6. It has distinctive features, however, in that not only the first switch group, i.e., output terminals 33-1 – 33-16 but also the second switch group, i.e., output terminals 34-2 – 34-15 are provided. As shown in the figure, each terminal of the second switch group 34-2 – 34-15 occupies a position one step further advanced than the first switch group 33-1 – 33-16 so that each pair of the output terminals, 33-2 and 34-2, 33-3 and 34-3, etc., may operate to switch simultaneously in response to the shifting of the said electromagnetic relays 30-1 – 30-16. Therefore, if the output voltage of the first switch group 33-1 – 33-16 is expressed as $Y_i$, then that of the second switch group 34-2 – 34-15 will be $Y_{i+1}$ (where the subscript $i$ stands for the integers 1, 2 .... 16). Both the output voltage $Y_i$ and $Y_{i+1}$ are supplied to a subtraction circuit 35 having a feedback resistance Z, where $Y_i - Y_{i+1}$ is computed. In addition, as is common practice, an instruction signal setter (potentiometer) 36 is connected to the pin board connection panel 32.

At the same time, the positional signal voltage X is supplied as an input not only to the said sequence circuit 25 but also to an addition circuit 37. As the other input, level signal voltages $X_1$ .... $X_{15}$ sorted stepwise are also supplied to the addition circuit 37 so as to obtain the computation of $X - X_i$. In this case, since the level signal voltage $X_i$ is arranged to be negative, the result of the computation gives $X - X_i$, the equivalent of a subtraction (where $i$, the subscript to X, stands for the integers 1, 2, 3 .... 15). Namely, the level signal generating circuit 38 makes an input signal voltage for the additional circuit 37 as well as that for the said sequence circuit 25. It should be noted that the third switch group 39-1 – 39-15 are switched, just as are the first and the second switch groups 33-1 – 33-16, 34-2 – 34-15 of the pin board connection plate 32, by means of the said electromagnetic relays 30-1 – 30-16. Each output thus obtained, however, represents the negative voltage derived as has already been stated. Next, each output of the subtraction circuit 35 and the addition circuit 37 is computed again by the multiplication circuit 40 to obtain the product of $(Y_{i+1} - Y_i) \times (X - X_i)$. Then, the resultant product is fed finally to an addition circuit 41, where the output voltage $Y_i$ of the first switch group 33-1 – 33-16 of the pin board connection panel 32 is added to produce an instruction signal voltage Y according to the following equation.

$$Y = (Y_{i+1} - Y_i) \times (X - X_i) + Y_i \ldots \quad (1)$$

Figure 7:
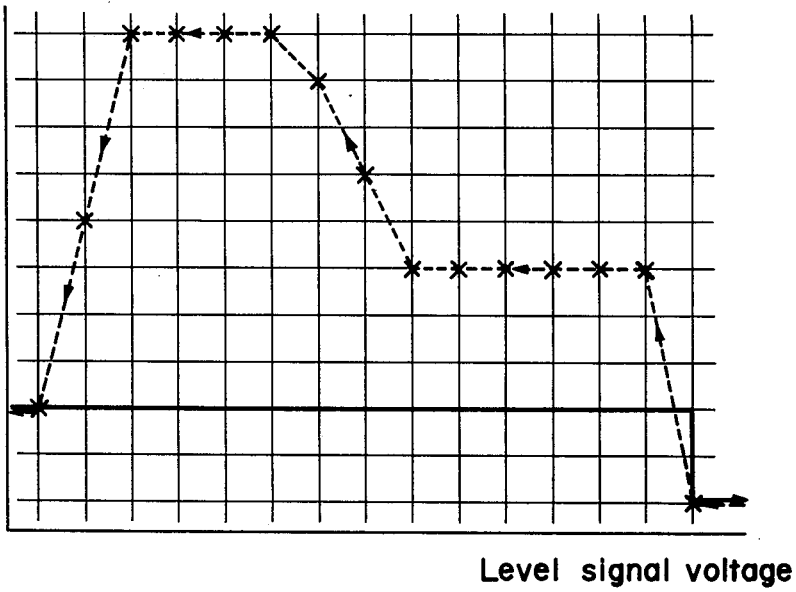
FIG. 7 represents a characteristic diagram showing the instruction signal voltage of the servo-controller according to the present invention and FIG. 8 illustrates a typical pin arrangement on the pin board connection panel.
Figure 8:
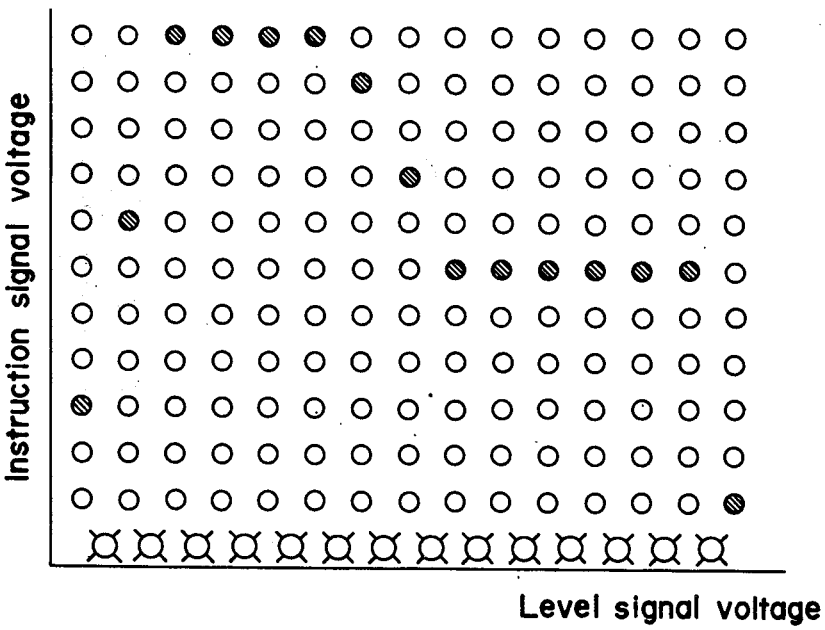

The instruction signal voltage Y according to the said equation makes a discontinuity function signal voltage which connects linearly the instruction signal voltages corresponding to two programmed set points as shown in FIG. 7. This signal voltage is supplied as an input to a servo-amplifier 18. In this case, the pin board connection panel 32 is determined in the pin arrangement as shown in FIG. 8. Note that, in FIG. 2, the power circuit is identified by 42.

At this point further explanation will be given of the principle of the discontinuity function generator 17. If the input voltage and the output voltage of the pin board connection plate 32 are taken as X and Y, respectively, the following equation holds.

$$Y = \frac{Y_{i+1} - Y_i}{X_{i+1} - X_i} (X - X_i) + Y_i \quad (2)$$

where
$X_i$ : Input voltage coordinate level
$Y_i$ : Output voltage coordinate level
($i = 1, 2, \ldots 15$)

Provided that differential voltages between adjacent level signal voltages are constant, the following equation may be assumed.

$X_{i+1} - X_i =$ Constant $= 1$

Therefore, $Y = (Y_{i+1} - Y_i)(X - X_i) + Y_i \ldots$ (3)

And, as long as the input voltage X changes only between $X_i$ and $X_{i+1}$, the output voltage Y will be a function signal of the first degree. Since this principle is applied, however, to the linear function generating circuit, in cases where a settable discontinuity function generating circuit is formed by applying this principle, two subtraction circuits for computing $(Y_{i+1} - Y_i)$ and $(X - X_i)$, a multiplication circuit for computing $(Y_{i+1} - Y_i) \times (X - X_i)$ and an addition circuit for adding $Y_i$ to the product finally must be arranged in conformity with the said equation (3). This principle, in fact, is precisely that which underlies the circuit formation shown in FIG. 2.

As evident from equation (3), immediately after the input voltage X reaches a sorted level signal voltage $X_i$, i.e., $X = X_i$, X becomes approximately equal to $X_i$, i.e., $X \approx X_i$, and $X - X_i \approx 0$. Therefore, the equation (3) becomes $Y = Y_i$ (where the product $[(Y_{i+1} - Y_i) \times (X - X_i) \approx 0]$ and the output signal voltage Y is kept at a constant level. Furthermore, just before $X = X_{i+1}$, i.e., the input voltage X reaches a sorted level voltage $X_{i+1}$, X becomes also approximately equal to $X_{i+1}$, i.e., $X \approx X_{i+1}$, and $X - X_i \approx 1$. Therefore, $Y = (Y_{i+1} - Y_i) + Y_i = Y_{i+1}$. Thus, the output signal voltage Y is kept also at a constant level.

In view of above, it will be realized that the output voltage Y, i.e., the instruction signal voltage is kept constant for the position where $X \approx X_i$, i.e., just after or before $X = X_i$, where the positional signal voltage X equals to the level signal voltage $X_i$. Therefore, the output voltage coordinate levels $Y_i$, $Y_{i+1}$ and the level signal voltage $X_i$ may be arranged so as to be switched selectively as the positional signal voltage X reaches the level voltage $X_i$.

As evident from the above explanation, the output signal voltage of the settable discontinuity function generator 17 always makes a settable discontinuity function voltage which interpolates linearly between the voltages corresponding to two instruction signal set points of the pin board connection plate 32. And this output signal voltage is given as an input to the servo-amplifier 18, the output of which controls the vertical motion of the mandrel cylinder 20 according to the conventional method as was already stated.

As is evident from an embodiment example such as the abovementioned, the extrusive motion of the injection cylinder 12 switches the program signal set point progressively according to an analog positional signal voltage derived from the changing position of the cylinder. The vertical motion of a mandrel cylinder 20 and the extrusive motion of an injection cylinder 12 are always carried out, therefore, in exact correspondence with each other so that the wall thickness of a parison 24 may be formed precisely. In addition, since the output signal of the servo-controller 16 responds to the difference between the discontinuity function signal voltage of the discontinuity function generator 17 and the feed-back signal voltage from the differential transformer 21 corresponding to the mandrel cylinder 20, the wall thickness of the parison 24 may be controlled smoothly and over a very wide range irrespective of whether the cyclic motion is slow or quick. Furthermore, since the servo-controller 16 is provided with feedback capabilities, the troubles caused by erroneous work sequences due to noises and other unexpected causes may be inhibited to the maximum extent.

In the said embodiment example relating to parison extrusion equipment, the position control of a mandrel cylinder 20 was dealt with in respect to the positional signal for an injection cylinder 12. Namely, both the input and the output of the servo-controller 16 related to the control of position vs. position. The present invention, however, is not limited to such a case, and may be applied to various cases, e.g., where a speed control output is obtained according to a positional signal input and where a pressure, force or torque control output is obtained with respect to a positional signal input. Furthermore, since input signals of the servo-controller according to the present invention are not limited to positional signals, it is also applicable to some other cases where speed, pressure, force or torque may be converted to an analog signal. In this case, various loads such as position, speed, pressure, torque, etc. may be controlled.

As stated above, the servo-controller according to the present invention consists of a discontinuity function generating circuit and a servo-amplifier, its instruction signal voltage (or current) being subjected to a discontinuity function which may be determined at will by means of the pin arrangement on a pin board connection panel. Therefore, a smoother load control is effected over a wider range than with the conventional equipment which programs the load control condition by means only of the pin arrangement on a pin board connection panel to obtain step-wise instruction signal voltages. In addition, this servo-controller has a feedback sequence function and is hardly affected by electric noises due to fluctuating power source voltage or various other causes. There is little danger, therefore, of motion being induced in error. As is evident from the embodiment example stated above, the equipment is rather simple in structure, practical and applicable to various machines in the field of industrial machinery. It will be of great utility in this field.

We have explained the present invention hitherto with reference to a particular preferred embodiment example, but it is quite clear that a number of modifications may be made without exceeding the scope of the present invention. It is hoped, therefore, that the scope of the patent claims which follow will include all modifications which produce substantially the effect of the present invention by using equipment substantially identical or equivalent to the category of the present invention.

What is claimed is:

1. A servo-controller, particularly for controlling the wall thickness of an extruded parison, comprising sequence circuit means for comparing an input analog signal with each of a number of stepwise-sorted level signals and for producing one or more comparison signals in dependence upon the state of said analog signal;

a number of relay circuits arranged in correspondence with each of said level signals so as to respond to said comparison signals produced by said sequence circuit means;

a pin board connection panel having first and second switch group means operative for affecting the output and responsive to successive operations of said relay circuits, said first switch group means producing a set signal and said second switch group means including a plurality of switches each serving to operate switches which always operate the next step to each corresponding switch of said first switch group means; and settable discontinuity function generating circuit means comprising logic circuit means for subtracting said set signal obtained through said first switch group means from the signal obtained through said second switch group means, thereupon subtracting said analog input signal from the respective level signal, multiplying the thus obtained subtraction results and adding said set signal through said first switch group means to the multiplicand, so that the output of said discontinuity function generating circuit means forms a signal which serves as the input for a servo-amplifier.

2. A servo-controller as defined in claim 1, wherein said discontinuity function generating circuit means comprises a single string of resistors.

3. A servo-controller as defined in claim 2, wherein said resistors are potentiometers.

4. A servo-controller as defined in claim 1; further comprising position detector means operative for detecting the displacement of an injection element and furnishing said analog signal to said sequence circuit means; and means adjustable for determining the wall thickness of an extruded parison, said adjustable means being conrolled by said output signal of said settable discontinuity function generating circuit means.

5. An apparatus for extruding hollow parisons of thermoplastic material, comprising an extrusion nozzle; a mandrel cooperating with said extrusion nozzle and being movable relative thereto to define a plurality of annular gaps of different radial widths; passage means communicating with said extrusion nozzle to supply the same with thermoplastic material to be extruded; ram means movable in and relative to said passage means to force said thermoplastic material therein towards said extrusion nozzle; position detector means operative for detecting the displacement of said ram means and generating a position-dependent analog signal; and a servo-controller for controlling the wall thickness of the extruded thermoplastic parison, comprising sequence circuit means for comparing an input analog signal with each of a number of stepwise-sorted level signals and for producing one or more comparison signals in dependence upon the state of said analog signal;

a number of relay circuits arranged in correspondence with each of said level signals so as to respond to said comparison signals produced by said sequence circuit means;

a pin board connection panel having first and second switch group means operative for affecting the output and responsive to successive operations of said relay circuits, said first switch group means producing a set signal and said second switch group means including a plurality of switches each serving to operate switches which always operate the next step to each corresponding switch of said first switch group means, and settable discontinuity function generating circuit means comprising logic circuit means for subtracting said set signal obtained through said first switch group means from the signal obtained through said second switch group means, thereupon subtracting said analog input signal from the respective level signal, multiplying the thus obtained subtraction results and adding said set signal through said first switch group means to the multiplicand, so that the output of said discontinuity function generating circuit means forms a signal which serves as the input for a servo-amplifier.

* * * * *